(12) United States Patent
Yang (10) Patent No.: US 10,477,854 B1
(45) Date of Patent: Nov. 19, 2019

(54) MOUSETRAP WITH ALARMING AND REMINDING FUNCTIONS

(71) Applicant: Qianming Yang, Guangdong (CN)

(72) Inventor: Qianming Yang, Guangdong (CN)

( * ) Notice: Subject to any disclaimer, the term of this patent is extended or adjusted under 35 U.S.C. 154(b) by 0 days.

(21) Appl. No.: 16/164,815

(22) Filed: Oct. 19, 2018

(51) Int. Cl.
*G08B 23/00* (2006.01)
*A01M 23/24* (2006.01)
*A01M 23/30* (2006.01)

(52) U.S. Cl.
CPC .......... *A01M 23/245* (2013.01); *A01M 23/30* (2013.01); *A01M 2200/00* (2013.01)

(58) Field of Classification Search
CPC . A01M 23/245; A01M 23/30; A01M 2200/00
USPC ...................................... 340/573.2
See application file for complete search history.

(56) References Cited

U.S. PATENT DOCUMENTS

| | | | | |
|---|---|---|---|---|
| 6,775,946 B2* | 8/2004 | Wright | ................. | A01M 21/00 43/58 |
| 8,026,822 B2* | 9/2011 | Borth | ................... | A01M 1/026 340/573.2 |
| 8,418,396 B2* | 4/2013 | Moustirats | .......... | A01M 31/002 43/58 |
| 9,015,987 B2* | 4/2015 | Moran | .................. | A01M 23/16 340/573.2 |
| 9,380,775 B2* | 7/2016 | Frojmovics | ........... | A01M 23/08 |
| 2004/0020100 A1* | 2/2004 | O'Brien | ................ | A01M 23/18 43/1 |
| 2008/0204253 A1* | 8/2008 | Cottee | ................. | A01M 23/245 340/573.2 |
| 2013/0174469 A1* | 7/2013 | Kittelson | ............... | A01M 23/18 43/61 |
| 2016/0021867 A1* | 1/2016 | Frojmovics | ........... | A01M 23/08 340/573.2 |
| 2019/0037829 A1* | 2/2019 | Laut | .................... | A01M 31/002 |

* cited by examiner

Primary Examiner — Tanmay K Shah (57) ABSTRACT

The present invention discloses a mousetrap with alarming and reminding functions, including a mousetrap shell, a mouse clip and a vibration induction alarm are disposed inside the mousetrap shell, the vibration induction alarm includes an alarm shell, a circuit board, a power supply device, a buzzer and a vibration sensor, a voltage comparison module and an alarm signal control module are disposed on the circuit board. The present invention can prevent the mouse clip from injuring pets and children, thereby enhancing safety use performance of the mousetrap. Moreover, the vibration induction alarm of the mousetrap can trigger the buzzer to give an alarm according to strength of a vibration induction signal, so as to remind a user that a mouse is catched by the mousetrap.

11 Claims, 9 Drawing Sheets

MOUSETRAP WITH ALARMING AND REMINDING FUNCTIONS

BACKGROUND OF THE INVENTION

The present invention relates to the technical field of mousetraps, and more particularly relates to a mousetrap with alarming and reminding functions.

A traditional mouse clip generally includes a bottom plate, a clip disposed on the bottom plate, and a trigger plate. When a mouse steps on the trigger plate, the clip can be immediately closed to trap the mouse. However, such mouse clip is easy to clamp pets and children due to lack of a protective housing.

To this end, there are also some mousetraps with protective shells on the market currently. The mouse clip is installed inside the protective shell. After the mouse enters the protective shell and touches the mouse clip, the mouse clip can trap the mouse. However, the existing mouse clip only has a trapping function and has the single function. Moreover, because the mouse clip is not placed for a short time and needs to be placed for a long time, many users forget the position where the mouse clip is placed due to the long time. After the mouse is trapped, the mouse clip cannot automatically send a reminding signal. A stench source is found out only when a corpse of the mouse is smelly, thereby affecting the use of the users.

BRIEF SUMMARY OF THE INVENTION

The purpose of the present invention is to overcome the above defects in the prior art, and provide a mousetrap with alarming and reminding functions. The mousetrap has a protective shell which can avoid clamping pets and children and can trigger an alarm according to strength of a vibration induction signal, so as to remind the user that the mouse is caught by the mousetrap, thereby facilitating the use of the user.

To achieve the above purpose, the present invention provides a mousetrap with alarming and reminding functions, including a mousetrap shell, wherein a mouse cavity is formed inside the mousetrap shell; a mousetrap inlet communicated with the mouse cavity is formed in the mousetrap shell; a mouse clip and a vibration induction alarm are disposed inside the mousetrap shell; the vibration induction alarm includes: an alarm shell; and a circuit board, a power supply device, a buzzer to give an alarm and a vibration sensor to detect vibration strength of the mousetrap, which are respectively installed inside the alarm shell; the vibration sensor and the buzzer are respectively connected to the circuit board; a voltage comparison module and an alarm signal control module are disposed on the circuit board; the alarm signal control module is electrically connected with the power supply device, the voltage comparison module and the buzzer respectively; and the voltage comparison module is electrically connected with the vibration sensor and the power supply device respectively.

As a preferred embodiment, the mousetrap shell includes a bottom shell and a flipping cover; shaft body installing holes are respectively formed in two side surfaces of a front end of the flipping cover; shaft bodies on both sides of the alarm shell are inserted into the shaft body installing holes of the flipping cover so that the flipping cover and the bottom shell realize rotatable connection; flipping cover torsional springs are respectively disposed on the shaft bodies on both sides of the alarm shell; one torsional spring arm of each of the flipping cover torsional springs is abutted against the flipping cover, and the other torsional spring arm of each of the flipping cover torsional springs is abutted against the alarm shell; and the flipping cover can flip up and down relative to the bottom shell, so as to open or close the mousetrap shell.

As a preferred embodiment, a cover locking component is disposed at the rear end of the flipping cover; a cover locking matching component is disposed at the rear end of the bottom shell; and the flipping cover is clamped with the cover locking matching component of the bottom shell through the cover locking component so that the flipping cover and the bottom shell are kept in a closed state.

As a preferred embodiment, the cover locking component includes an inserting tongue and at least one clamping convex body; the inserting tongue is connected to the flipping cover; the clamping convex body is disposed on an outer surface of the inserting tongue; the cover locking matching component includes a clamping through hole formed in the end of the bottom shell; and when the flipping cover and the bottom shell are closed, the clamping convex body is inserted into the clamping through hole.

As a preferred embodiment, the mousetrap also includes a cover unlocking key; the front end of the cover unlocking key is provided with a cover unlocking plug; the cover unlocking plug of the cover unlocking key can be inserted into the clamping through hole of the bottom shell from the exterior of the bottom shell; the clamping convex body on the inserting tongue is ejected from the clamping through hole so as to open the flipping cover; and a key inserting hole used to place the cover unlocking key is formed in the bottom of the bottom shell.

As a preferred embodiment, the mouse clip includes a bottom plate, a touch pedal, a locking hook, a clip, a clip torsional spring, a pin shaft and pins; both sides of the bottom plate are provided with pin shaft installing side plates; a bait placing cup located at a front end, two locking hook installing plates located at a rear end, and two pedal locating plates located between the bait placing cup and the locking hook installing plates are disposed on the bottom plate; a limiting movable groove is formed between the two locking hook installing plates; a bait through hole corresponding to the position of the bait placing cup is formed in the touch pedal; a pair of parallel pedal supporting sheets are disposed on the bottom of the rear end of the touch pedal; a pedal locating groove is formed between the two pedal supporting sheets; the pin shaft is installed between the two pin shaft installing side plates and penetrates through first pin shaft holes formed in the pedal supporting sheets and second pin shaft holes formed in the pedal locating plates so that the touch pedal is rotatably installed on the pin shaft; the pedal locating plates are inserted into the pedal locating groove formed between the two pedal supporting sheets; the clip is configured as an annular frame and is bent into a V-shaped structure; arc-shaped bent parts are respectively disposed on both sides of the clip; the pin shaft is installed at the arc-shaped bent parts of the clip; the clip torsional spring is installed on the pin shaft; one torsional spring arm of the clip torsional spring is abutted against the bottom plate, and the other torsional spring arm of the clip torsional spring is abutted against the side edge part of the rear end of the clip; the locking hook is installed in the limiting movable groove formed between the two locking hook installing plates; the locking hook is rotatably installed on the locking hook installing plates through the pins which penetrate through first pin holes formed in the locking hook installing plates and a second pin hole formed in the rear end of the locking hook; the front end of the locking hook is provided with a front-end locking hook; the rear end of the locking hook is provided with a rear-end locking hook; the front end of the locking hook can penetrate through a locking hook inserting hole formed at the rear end of the touch pedal and can be hooked on the touch pedal through the front-end locking hook; and the rear end of the locking hook can be hooked on the tip of the rear end of the clip through the rear-end locking hook.

As a preferred embodiment, the front end of the bottom plate is provided with an end gear rack and side gear racks located on both sides of the end gear rack; and a gear rack inserting hole used to insert the end gear rack is formed in the front end of the touch pedal.

As a preferred embodiment, the power supply device is configured as a battery or an external power supply.

As a preferred embodiment, a power switch and an LED lamp used to perform the reminding function of light source are disposed on the circuit board; the power switch and the LED lamp respectively extend out of the top of the alarm shell; the power switch is connected in series to a positive output terminal of the power supply device; and the LED lamp is electrically connected with the alarm signal control module.

As a preferred embodiment, the alarm shell includes an alarm upper shell and an alarm lower shell; the alarm upper shell is installed on the alarm lower shell; the shaft bodies are connected to both sides of the alarm upper shell; the alarm lower shell is installed above the mousetrap inlet; and an arched structure is formed on the bottom of the alarm lower shell.

Compared with the prior art, the present invention has the following beneficial effects:

The mouse clip in the present invention is installed inside the mousetrap shell, so as to prevent the mouse clip from injuring the pets and the children, thereby enhancing safety use performance of the mousetrap. Moreover, the vibration induction alarm of the mousetrap can trigger the buzzer to give an alarm according to the strength of the vibration induction signal, so as to remind the user that the mouse is catched by the mousetrap, thereby facilitating the use of the user.

DETAILED DESCRIPTION OF THE INVENTION

Figure 1:
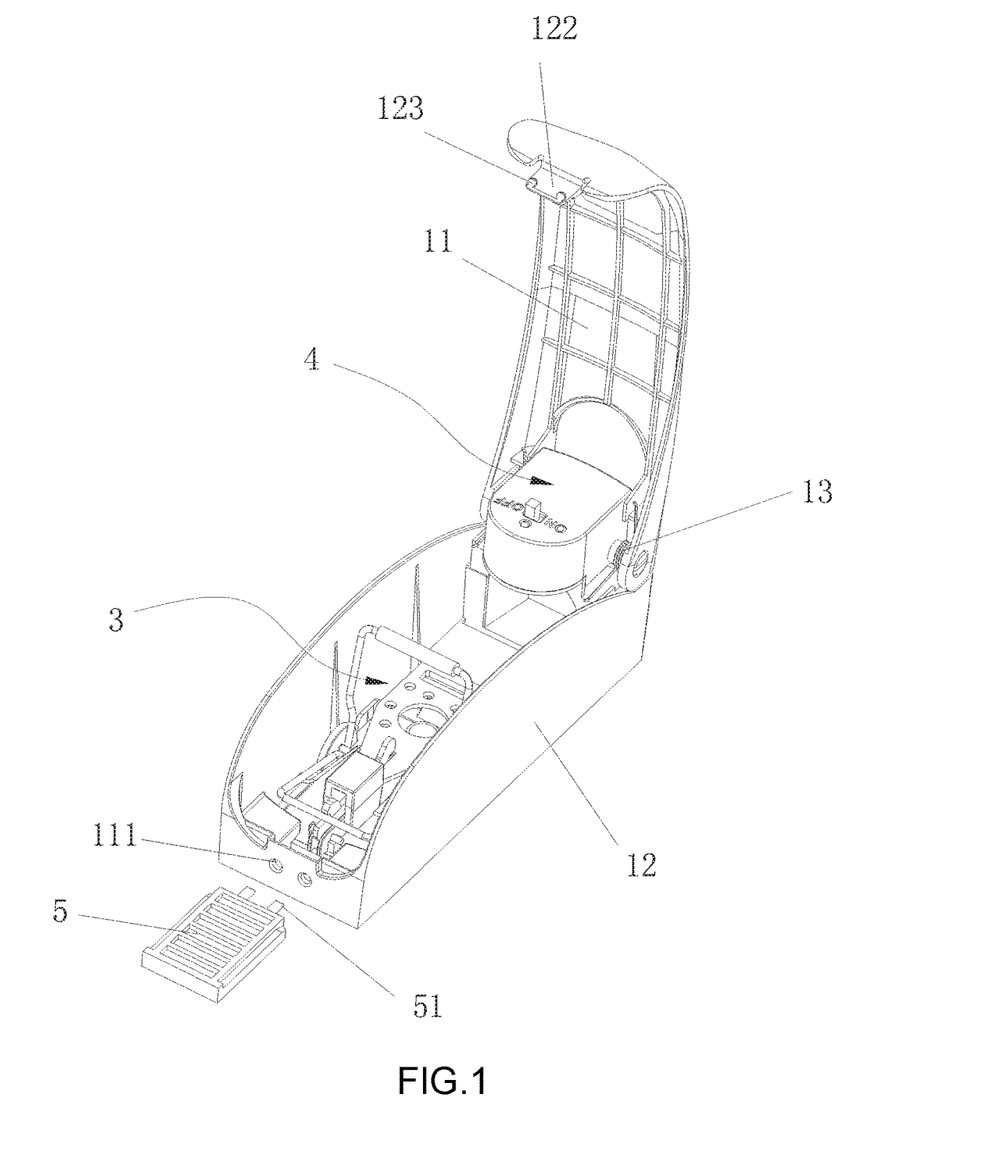
FIG. 1 is a structural schematic diagram of a mousetrap in an opened state provided in an embodiment of the present invention.
Figure 2:
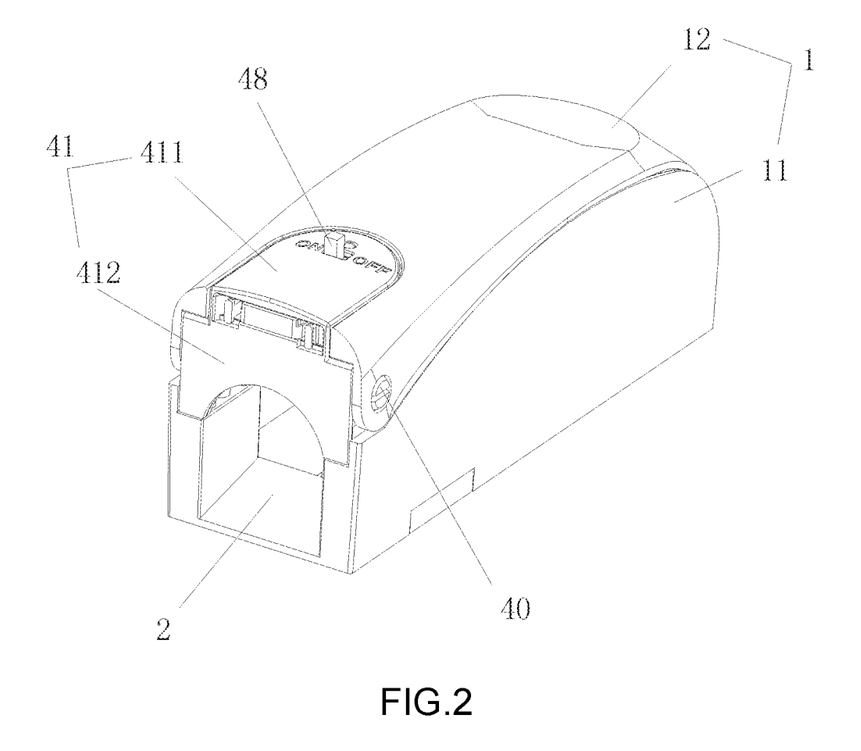
FIG. 2 is a structural schematic diagram I of a mousetrap in a closed state provided in an embodiment of the present invention.

By referring to FIG. 1 and FIG. 2, an embodiment of the present invention provides a mousetrap with alarming and reminding functions, including a mousetrap shell 1, wherein a mouse cavity is formed inside the mousetrap shell 1; a mousetrap inlet 2 communicated with the mouse cavity is formed in the mousetrap shell 1; and a mouse clip 3 and a vibration induction alarm 4 are disposed inside the mousetrap shell 1. The present embodiment is described below in detail with reference to drawings.

Figure 4:
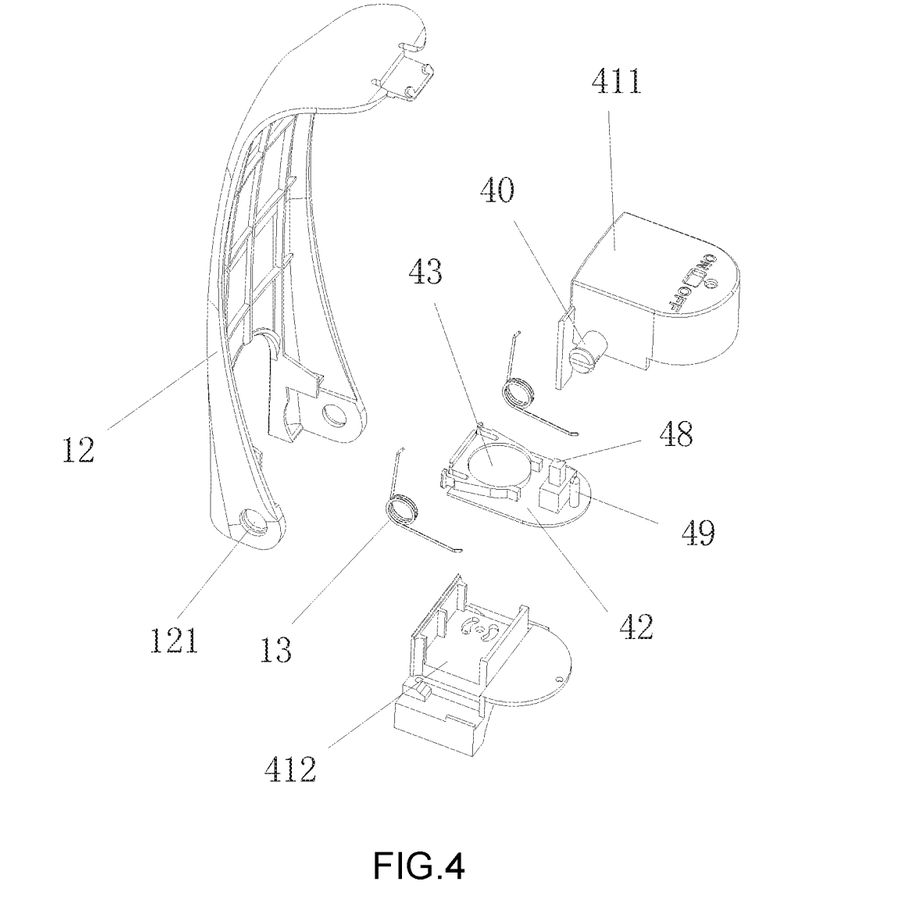
FIG. 4 is a structural schematic diagram of a flipping cover and a vibration induction alarm provided in an embodiment of the present invention.

As shown in FIG. 1 and FIG. 4, in the present embodiment, the mousetrap shell 1 may include a bottom shell 11 and a flipping cover 12; the mousetrap inlet 2 is disposed in the front end of the bottom shell 11; shaft body installing holes 121 are respectively formed in two side surfaces of a front end of the flipping cover 12; shaft bodies 40 on both sides of the alarm shell 41 are inserted into the shaft body installing holes 121 of the flipping cover 12 so that the flipping cover 12 and the bottom shell 11 realize rotatable connection; flipping cover torsional springs 13 are respectively disposed on the shaft bodies 40 on both sides of the alarm shell 41; one torsional spring arm of each of the flipping cover torsional springs 13 is abutted against the flipping cover 12, and the other torsional spring arm of each of the flipping cover torsional springs 13 is abutted against the alarm shell 41. During use, the flipping cover 12 can flip up and down relative to the bottom shell 11, so as to open or close the mousetrap shell 1, thereby bringing convenience for the user to use and clean the trapped mouse.

Of course, in another embodiment, the flipping cover 12 can also be directly hinged with the bottom shell 11. In this way, the flipping cover 12 can also flip up and down relative to the bottom shell 11.

To lock the flipping cover 12, a cover locking component is disposed at the rear end of the flipping cover 12; a cover locking matching component is disposed at the rear end of the bottom shell 11; and the flipping cover 12 is clamped with the cover locking matching component of the bottom shell 11 through the cover locking component so that the flipping cover 12 and the bottom shell 11 are kept in a closed state.

In the present embodiment, preferably, the cover locking component may include an inserting tongue 122 and at least one clamping convex body 123; the inserting tongue 122 is connected to the flipping cover 12; and the clamping convex body 123 is disposed on an outer surface of the inserting tongue 122. Correspondingly, the cover locking matching component may include a clamping through hole 111 formed in the end of the bottom shell 11. When the flipping cover 12 and the bottom shell 11 are closed, the clamping convex body 123 is inserted into the clamping through hole 111.

Figure 3:
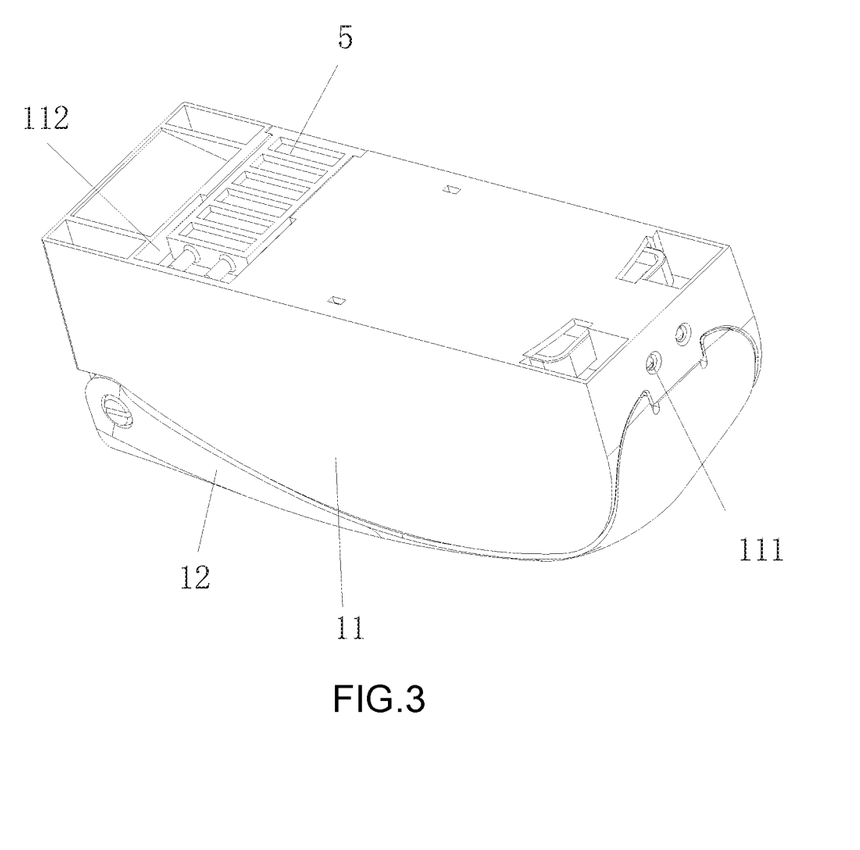
FIG. 3 is a structural schematic diagram II of a mousetrap in a closed state provided in an embodiment of the present invention.

As shown in FIG. 1 and FIG. 3, for the convenience of opening the flipping cover 12 for the user to separate the clamping convex body 123 from the clamping through hole 111, the mousetrap also includes a cover unlocking key 5. The front end of the cover unlocking key 5 is provided with a cover unlocking plug 51. The cover unlocking plug 51 of the cover unlocking key 5 can be inserted into the clamping through hole 111 of the bottom shell 11 from the exterior of the bottom shell 11. The clamping convex body 123 on the inserting tongue 122 is ejected from the clamping through hole 111 so as to open the flipping cover 12.

Preferably, a key inserting hole 112 used to place the cover unlocking key 5 is formed in the bottom of the bottom shell 11, and is convenient for carrying the cover unlocking key 5.

As shown in FIG. 5 to FIG. 8, the mouse clip 3 includes a bottom plate 31, a touch pedal 32, a locking hook 33, a clip 34, a clip torsional spring 35, a pin shaft 36 and pins 37; both sides of the bottom plate 31 are provided with pin shaft installing side plates 311; a bait placing cup 312 located at a front end, two locking hook installing plates 313 located at a rear end, and two pedal locating plates 314 located between the bait placing cup 312 and the locking hook installing plates 313 are disposed on the bottom plate 31; a limiting movable groove 315 is formed between the two locking hook installing plates 313; a bait through hole 321 corresponding to the position of the bait placing cup 312 is formed in the touch pedal 32; a pair of parallel pedal supporting sheets 322 are disposed on the bottom of the rear end of the touch pedal 32; a pedal locating groove 323 is formed between the two pedal supporting sheets 322; the pin shaft 36 is installed between the two pin shaft installing side plates 311 and penetrates through first pin shaft holes 324 formed in the pedal supporting sheets 322 and second pin shaft holes 316 formed in the pedal locating plates 314 so that the touch pedal 32 is rotatably installed on the pin shaft 36; and the pedal locating plates 314 are inserted into the pedal locating groove 323 formed between the two pedal supporting sheets 322.

The clip 34 is configured as an annular frame, is bent into a V-shaped structure and may be an iron clip. Arc-shaped bent parts 341 are respectively disposed in the middles of both sides of the clip 34. The pin shaft 36 is installed at the groove position of the arc-shaped bent parts 341 of the clip 34. When the clip 34 rotates, the arc-shaped bent parts 341 of the clip 34 can be used as a fulcrum in rotation. The clip torsional spring 35 is installed on the pin shaft 36. One torsional spring arm of the clip torsional spring 35 is abutted against the bottom plate 31, and the other torsional spring arm of the clip torsional spring 35 is abutted against the side edge part of the rear end of the clip 34. The locking hook 33 is installed in the limiting movable groove 315 formed between the two locking hook installing plates 313; the locking hook 33 is rotatably installed on the locking hook installing plates 313 through the pins 37 which penetrate through first pin holes 316 formed in the locking hook installing plates 313 and a second pin hole 331 formed in the rear end of the locking hook 33; the front end of the locking hook 33 is provided with a front-end locking hook 332; the rear end of the locking hook 33 is provided with a rear-end locking hook 333; the front end of the locking hook 33 can penetrate through a locking hook inserting hole 325 formed at the rear end of the touch pedal 32 and can be hooked on the touch pedal 32 through the front-end locking hook 332; and the rear end of the locking hook 33 can be hooked on the tip of the rear end of the clip 34 through the rear-end locking hook 333.

Figure 5:
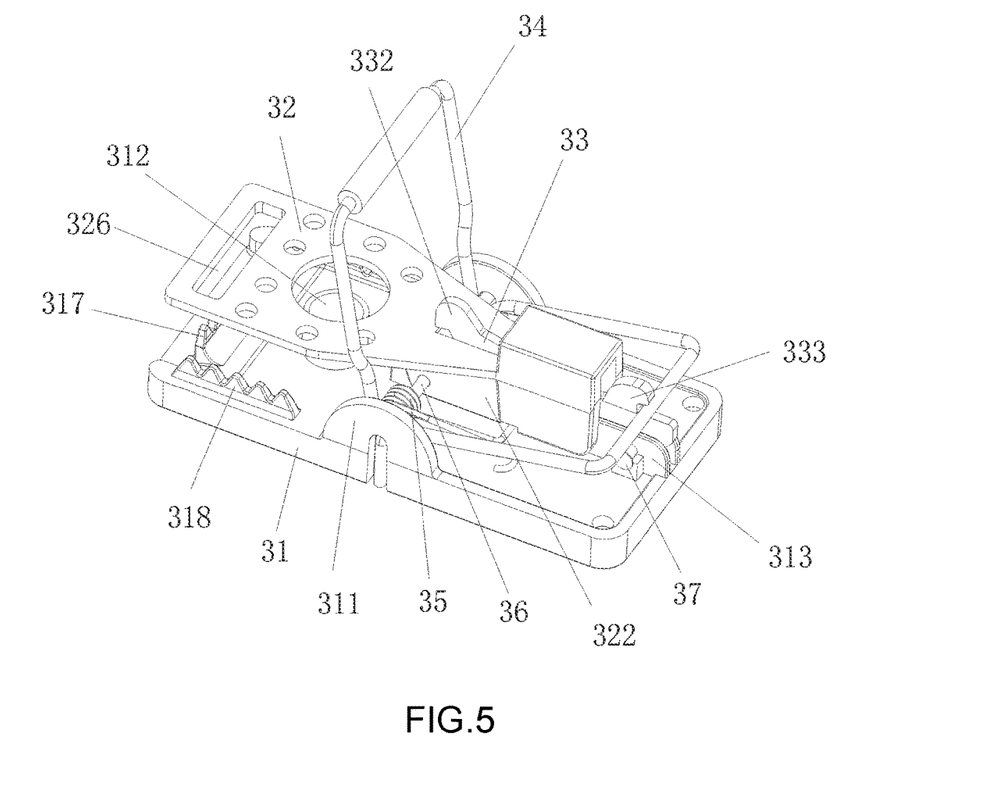
FIG. 5 is a structural schematic diagram of a mouse clip provided in an embodiment of the present invention.
Figure 6:
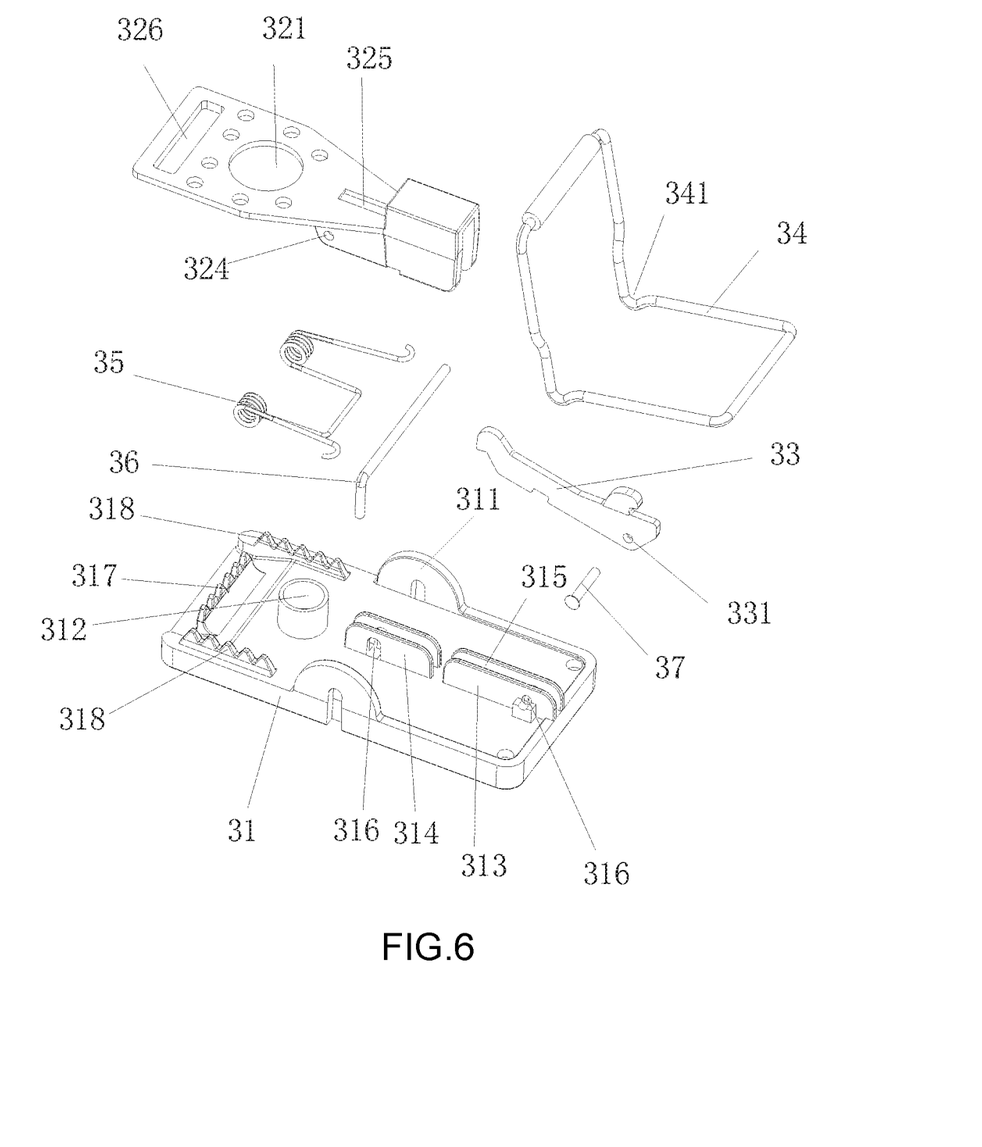
FIG. 6 is an exploded diagram of a mouse clip provided in an embodiment of the present invention.
Figure 7:
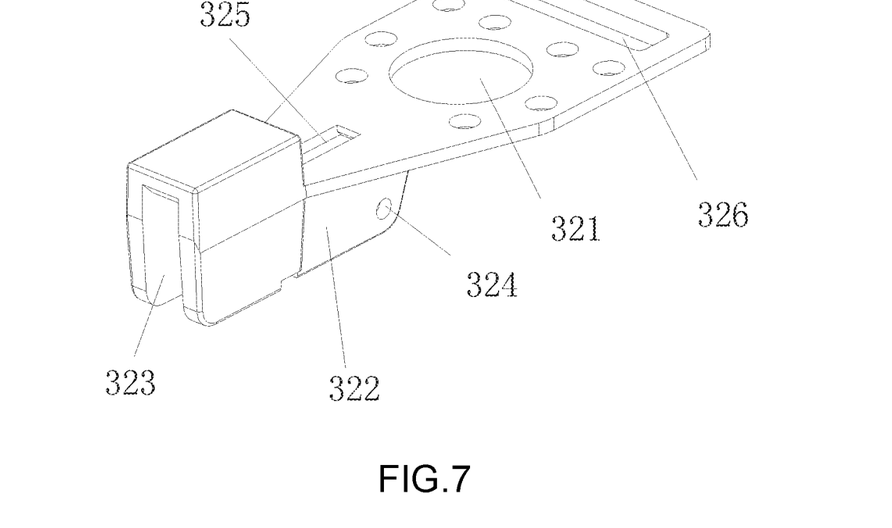
FIG. 7 is a structural schematic diagram of a touch pedal provided in an embodiment of the present invention.
Figure 8:
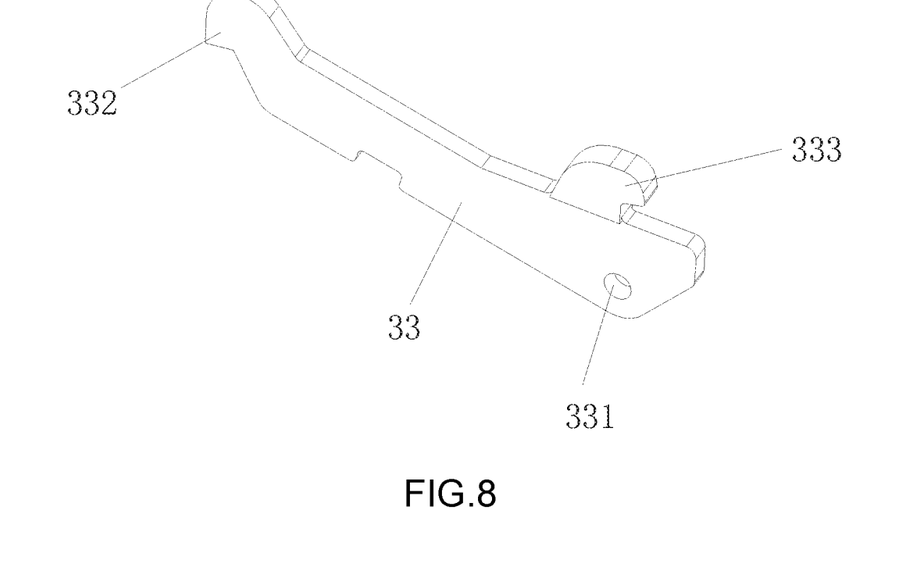
FIG. 8 is a structural schematic diagram of a locking hook provided in an embodiment of the present invention.

Preferably, to further improve the effect and the success rate of mouse trapping, the front end of the bottom plate 31 can be provided with an end gear rack 317 and side gear racks 318 located on both sides of the end gear rack 317; and a gear rack inserting hole 326 used to insert the end gear rack 317 is formed in the front end of the touch pedal 32. When the clip 34 is in a clamping state, the end gear rack 317 can be matched with the end of the front end of the clip 34 and the side gear racks 318 can be matched with both sides of the front end of the clip 34.

Before the mouse is trapped, a bait can be placed in the bait placing cup 312 by the user, and the clip 34 is flipped backwards so that the front-end locking hook 332 of the locking hook 33 is hooked to the touch pedal 32 and the rear-end locking hook 333 of the locking hook 33 is hooked to the tip of the rear end of the clip 34. At this moment, the mousetrap is in a state of waiting for trapping the mouse. When the mouse enters from the mousetrap inlet 2 and steps on the touch pedal 32, the front end of the touch pedal 32 is pressed by the mouse so that the touch pedal 32 flips forwards. At this moment, the front-end locking hook 332 of the locking hook 33 is separated from the touch pedal 32 and the rear-end locking hook 333 of the locking hook 33 is also separated from the tip of the rear end of the clip 34. Under the elastic action of the clip torsional spring 35, the clip 34 can flip forwards to clamp the mouse.

Figure 9:
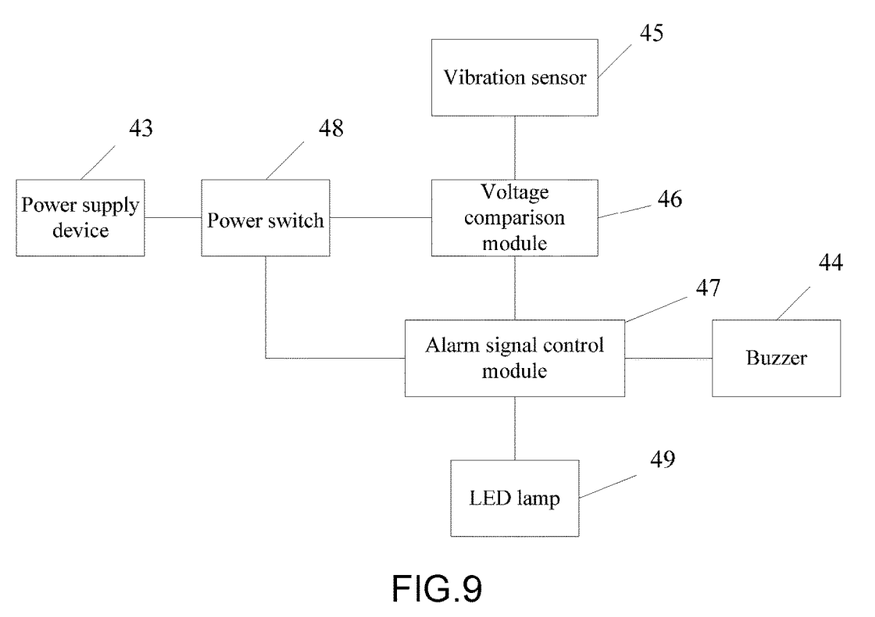
FIG. 9 is a circuit block diagram of a vibration induction alarm provided in an embodiment of the present invention.

As shown in FIG. 4 and FIG. 9, the vibration induction alarm 4 includes: an alarm shell 41; and a circuit board 42, a power supply device 43, a buzzer 44 to give an alarm and a vibration sensor 45 to detect vibration strength of the mousetrap, which are respectively installed inside the alarm shell 41; the vibration sensor 45 and the buzzer 44 are respectively connected to the circuit board 42; a voltage comparison module 46 and an alarm signal control module 47 are disposed on the circuit board 42; the alarm signal control module 47 is electrically connected with the power supply device 43, the voltage comparison module 46 and the buzzer 44 respectively; and the voltage comparison module 46 is electrically connected with the vibration sensor 45 and the power supply device 43 respectively.

In the present embodiment, the alarm shell 41 includes an alarm upper shell 411 and an alarm lower shell 412; the alarm upper shell 411 is installed on the alarm lower shell 412; the shaft bodies 40 are connected to both sides of the alarm upper shell 411; the alarm lower shell 412 is fixedly installed above the mousetrap inlet 2; and an arched structure is formed on the bottom of the alarm lower shell 412 and is matched with the mousetrap inlet 2.

In the present embodiment, the power supply device 43 may be preferably configured as a battery, such as 3V button battery. Of course, the power supply device 43 can also be configured as an external power supply according to practical needs as long as the power supply device 43 can supply power.

Figure 10:
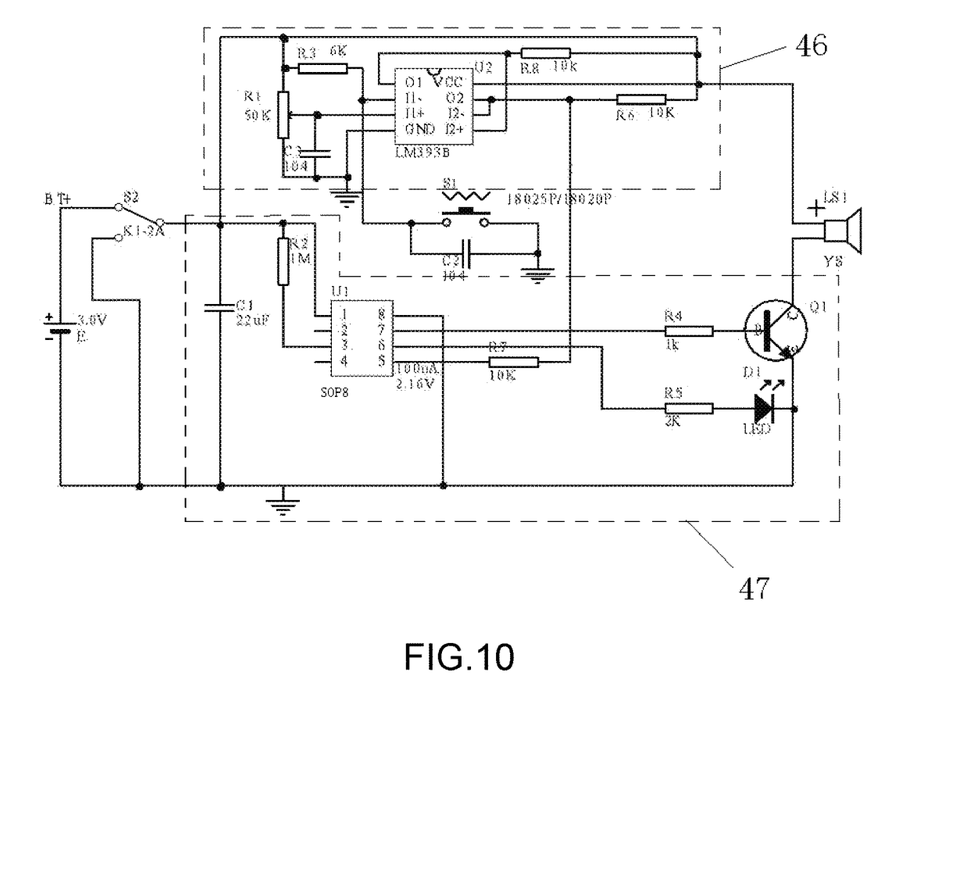
FIG. 10 is a circuit principle diagram of a vibration induction alarm provided in an embodiment of the present invention.

As shown in FIG. 10, the voltage comparison module 46 may specifically include a voltage comparator U2, a resistor R1, a resistor R3, a resistor R6, a resistor R8 and a capacitor C3. The alarm signal control module 47 may specifically include an alarm signal main control chip U1, a resistor R2, a resistor R4, a resistor R5, a resistor R7 and a triode Q1, wherein the voltage comparator U2 is connected with a battery E, the vibration sensor 45 (i.e., S1 in the figure) and the alarm signal main control chip U1; the alarm signal main control chip U1 is connected with the battery E; and the alarm signal main control chip U1 controls to start and stop the buzzer 44 (i.e., LS1 in the figure) through the triode Q1.

During work, the voltage comparator U2 can compare the voltage of the vibration induction signal transmitted by the vibration sensor 45, wherein the voltage is larger if the strength of the vibration induction signal is greater. When the strength of the vibration signal reaches a rated value, the voltage comparator U2 can transmit the signal to the alarm signal main control chip U1 so that the alarm signal main control chip U1 controls the buzzer 44 to give intermittent periodic alarms through the triode Q1.

Preferably, a power switch 48 and an LED lamp 49 used to perform the reminding function of light source can also be disposed on the circuit board 42; the power switch 48 and the LED lamp 49 respectively extend out of the top of the alarm shell 41; the power switch 48 is connected in series to a positive output terminal of the power supply device 43; the LED lamp 49 is electrically connected with the alarm signal main control chip U1 of the alarm signal control module 47; and the alarm signal main control chip U1 can control the LED lamp 49 to flash.

In conclusion, the mouse clip in the present invention is installed inside the mousetrap shell, so as to prevent the mouse clip from injuring the pets and the children, thereby enhancing the safety use performance of the mousetrap. Moreover, the vibration induction alarm of the mousetrap can trigger the buzzer to give an alarm according to the strength of the vibration induction signal, so as to remind the user that the mouse is catched by the mousetrap, thereby facilitating the use of the user.

The above embodiments are preferred implementation modes of the present invention, but the implementation modes of the present invention are not limited by the above embodiments. Any other change, modification, replacement, combination and simplification made without departing from the spiritual essence and principle of the present invention shall be equivalent substitution modes and are included in the protection scope of the present invention.

What is claimed is:

1. A mousetrap with alarming and reminding functions, comprising a mousetrap shell, wherein a mouse cavity is formed inside the mousetrap shell; a mousetrap inlet communicated with the mouse cavity is formed in the mousetrap shell; a mouse clip and a vibration induction alarm are disposed inside the mousetrap shell; the vibration induction alarm comprises: an alarm shell, and a circuit board, a power supply device, a buzzer to give an alarm and a vibration sensor to detect vibration strength of the mousetrap which are respectively installed inside the alarm shell; the vibration sensor and the buzzer are respectively connected to the circuit board; a voltage comparison module and an alarm signal control module are disposed on the circuit board; the alarm signal control module is electrically connected with the power supply device, the voltage comparison module and the buzzer respectively; and the voltage comparison module is electrically connected with the vibration sensor and the power supply device respectively; the mousetrap shell comprises a bottom shell and a flipping cover, shaft body installing holes are respectively formed in two side surfaces of a front end of the flipping cover; shaft bodies on both sides of the alarm shell are inserted into the shaft body installing holes of the flipping cover so that the flipping cover and the bottom shell realize rotatable connection; and the flipping cover can flip up and down relative to the bottom shell, so as to open or close the mousetrap shell.

2. The mousetrap with alarming and reminding functions according to claim 1, wherein flipping cover torsional springs are respectively disposed on the shaft bodies on both sides of the alarm shell; and one torsional spring arm of each of the flipping cover torsional springs is abutted against the flipping cover, and the other torsional spring arm of each of the flipping cover torsional springs is abutted against the alarm shell.

3. The mousetrap with alarming and reminding functions according to claim 1, wherein a cover locking component is disposed at a rear end of the flipping cover; a cover locking matching component is disposed at a rear end of the bottom shell; and the flipping cover is clamped with the cover locking matching component of the bottom shell through the cover locking component so that the flipping cover and the bottom shell are kept in a closed state.

4. The mousetrap with alarming and reminding functions according to claim 3, wherein the cover locking component comprises an inserting tongue and at least one clamping convex body; the inserting tongue is connected to the flipping cover; the clamping convex body is disposed on an outer surface of the inserting tongue; the cover locking matching component comprises a clamping through hole formed in an end of the bottom shell; and when the flipping cover and the bottom shell are closed, the clamping convex body is inserted into the clamping through hole.

5. The mousetrap with alarming and reminding functions according to claim 4, further comprising a cover unlocking key, wherein a front end of the cover unlocking key is provided with a cover unlocking plug; the cover unlocking plug of the cover unlocking key can be inserted into the clamping through hole of the bottom shell from the exterior of the bottom shell; the clamping convex body on the inserting tongue is ejected from the clamping through hole so as to open the flipping cover; and a key inserting hole used to place the cover unlocking key is formed in the bottom of the bottom shell.

6. The mousetrap with alarming and reminding functions according to claim 1, wherein the mouse clip comprises a bottom plate, a touch pedal, a locking hook, a clip, a clip torsional spring, a pin shaft and pins; both sides of the bottom plate are provided with pin shaft installing side plates; a bait placing cup located at a front end, two locking hook installing plates located at a rear end, and two pedal locating plates located between the bait placing cup and the locking hook installing plates are disposed on the bottom plate; a limiting movable groove is formed between the two locking hook installing plates; a bait through hole corresponding to the position of the bait placing cup is formed in the touch pedal; a pair of parallel pedal supporting sheets are disposed on the bottom of the rear end of the touch pedal; a pedal locating groove is formed between the two pedal supporting sheets; the pin shaft is installed between the two pin shaft installing side plates and penetrates through first pin shaft holes formed in the pedal supporting sheets and second pin shaft holes formed in the pedal locating plates so that the touch pedal is rotatably installed on the pin shaft; the pedal locating plates are inserted into the pedal locating groove formed between the two pedal supporting sheets; the clip is configured as an annular frame and is bent into a V-shaped structure; arc-shaped bent parts are respectively disposed on both sides of the clip; the pin shaft is installed at the arc-shaped bent parts of the clip; the clip torsional spring is installed on the pin shaft; one torsional spring arm of the clip torsional spring is abutted against the bottom plate, and the other torsional spring arm of the clip torsional spring is abutted against a side edge part of the rear end of the clip; the locking hook is installed in the limiting movable groove formed between the two locking hook installing plates; the locking hook is rotatably installed on the locking hook installing plates through the pins which penetrate through first pin holes formed in the locking hook installing plates and a second pin hole formed in a rear end of the locking hook; a front end of the locking hook is provided with a front-end locking hook; the rear end of the locking hook is provided with a rear-end locking hook; the front end of the locking hook can penetrate through a locking hook inserting hole formed at the rear end of the touch pedal and can be hooked on the touch pedal through the front-end locking hook; and the rear end of the locking hook can be hooked on the tip of the rear end of the clip through the rear-end locking hook.

7. The mousetrap with alarming and reminding functions according to claim 6, wherein a front end of the bottom plate is provided with an end gear rack and side gear racks located on both sides of the end gear rack; and a gear rack inserting hole used to insert the end gear rack is formed in a front end of the touch pedal.

8. The mousetrap with alarming and reminding functions according to claim 1, wherein the power supply device is configured as a battery or an external power supply.

9. The mousetrap with alarming and reminding functions according to claim 1, wherein a power switch is disposed on the circuit board; the power switch extends out of the top of the alarm shell; and the power switch is connected in series to a positive output terminal of the power supply device.

10. The mousetrap with alarming and reminding functions according to claim 1, wherein the circuit board is provided with an LED lamp used to perform a reminding function of light source; the LED lamp extends out of the top of the alarm shell; and the LED lamp is electrically connected with the alarm signal control module.

11. The mousetrap with alarming and reminding functions according to claim 1, wherein the alarm shell comprises an alarm upper shell and an alarm lower shell; the alarm upper shell is installed on the alarm lower shell; the shaft bodies are connected to both sides of the alarm upper shell; the alarm lower shell is installed above the mousetrap inlet; and an arched structure is formed on the bottom of the alarm lower shell.

* * * * *